United States Patent [19]
Paukert et al.

[11] 3,868,186
[45] Feb. 25, 1975

[54] OPACITY METER

[75] Inventors: Thomas T. Paukert, Berkeley; Eugene J. Rosa, El Cerrito, both of Calif.

[73] Assignee: Shell Oil Company, New York, N.Y.

[22] Filed: Mar. 4, 1974

[21] Appl. No.: 447,623

Related U.S. Application Data

[63] Continuation of Ser. No. 182,494, Sept. 21, 1971, abandoned.

[52] U.S. Cl. .................. 356/207, 356/204, 250/573
[51] Int. Cl. ..................... G01n 21/12, G01n 21/20
[58] Field of Search .......... 356/207, 224, 219, 204, 356/225, 226, 224, 219, 234; 250/573

[56] References Cited
UNITED STATES PATENTS

| | | | |
|---|---|---|---|
| 2,478,406 | 8/1949 | Lamb | 356/207 |
| 3,177,762 | 4/1965 | Ito | 356/213 |
| 3,514,209 | 5/1970 | McGhee et al. | 356/224 |
| 3,672,781 | 6/1972 | Rosenblum | 356/207 |

*Primary Examiner*—John K. Corbin
*Assistant Examiner*—Conrad Clark

[57] ABSTRACT

An opacity meter for measuring the light transmitted through a smoke plume using the sun as a light source and optics that limit the field of view to approximately 1° - 3° and produce a spectral response that approximates that of the human eye. The light transmitted is detected by a photodiode and the resulting electrical signal amplified and displayed on a meter that reads both the percentage of light transmitted and the corresponding Ringlemann number. The opacity meter also includes calibrating means using the sun as a reference to standardize the opacity meter prior to making measurements of a plume's opacity.

6 Claims, 3 Drawing Figures

OPACITY METER

CROSS-REFERENCE

This application is a continuation of our copending application Ser. No. 182,494, filed Sept. 21, 1971, now abandoned and entitled OPACITY METER.

BACKGROUND OF THE INVENTION

Present laws relating to air pollution are based on visual observation of smoke plumes and a comparision with a Ringlemann chart. The Ringlemann chart assigns members to various values of the percent of light transmitted from a source obscured by a smoke plume compared to the light transmitted directly from the source. Conventionally, an observer will observe the smoke plume and judge the opacity of the plume according to his previous training.

While visual observations are basically simple they have several disadvantages since it is impossible for an observer to discriminate between the optical properties of the smoke plume and confusing effects of the surrounding background. These background contrasts, such as clouds and changes in luminescence, affect measurements based on the legally defined Ringlemann Opacity Scale. Further, shifts in the luminescence result when small particles of the smoke reflect scattered light from other objects in the sky. As a result of the above interferences no two observers will normally agree on the exact opacity of a particular smoke plume. This, of course, makes it difficult to enforce present legislation relating to air pollution.

BRIEF DESCRIPTION OF THE INVENTION

The present invention solves the above problems by providing an opacity meter having an optical system which uses the sun as a light source to determine the light transmission qualities of a smoke plume. The optical system limits the field of view to a narrow angle, for example, 1°– 3° to reject secondary sources of light and other interferences. The sunlight is filtered so that the response of the device closely approximates that of the human eye. The sunlight passed by the optical system is detected by a suitable photodiode whose signal is amplified and displayed on a meter. The instrument is also provided with an eye piece which permits an operator to visually aim the optical system at the smoke plume and read the percentage of light transmission on the meter scale of equivalent Ringlemann numbers.

The instrument can be used during most weather conditions since it is calibrated before each use by observing the available light source directly and varying the instrument's response to obtain a preset meter reading. Once the instrument is calibrated, the operator can observe the smoke plume to determine its opacity. The instrument of course cannot operate when the sun is obscured or when moving clouds markedly change the available sunlight after the instrument has been calibrated.

BRIEF DESCRIPTION OF THE DRAWINGS

The invention will be more easily understood from the following detailed description of the preferred embodiment when taken in conjunction with the attached drawings in which.

DESCRIPTION OF THE PREFERRED EMBODIMENT

Figure 1:
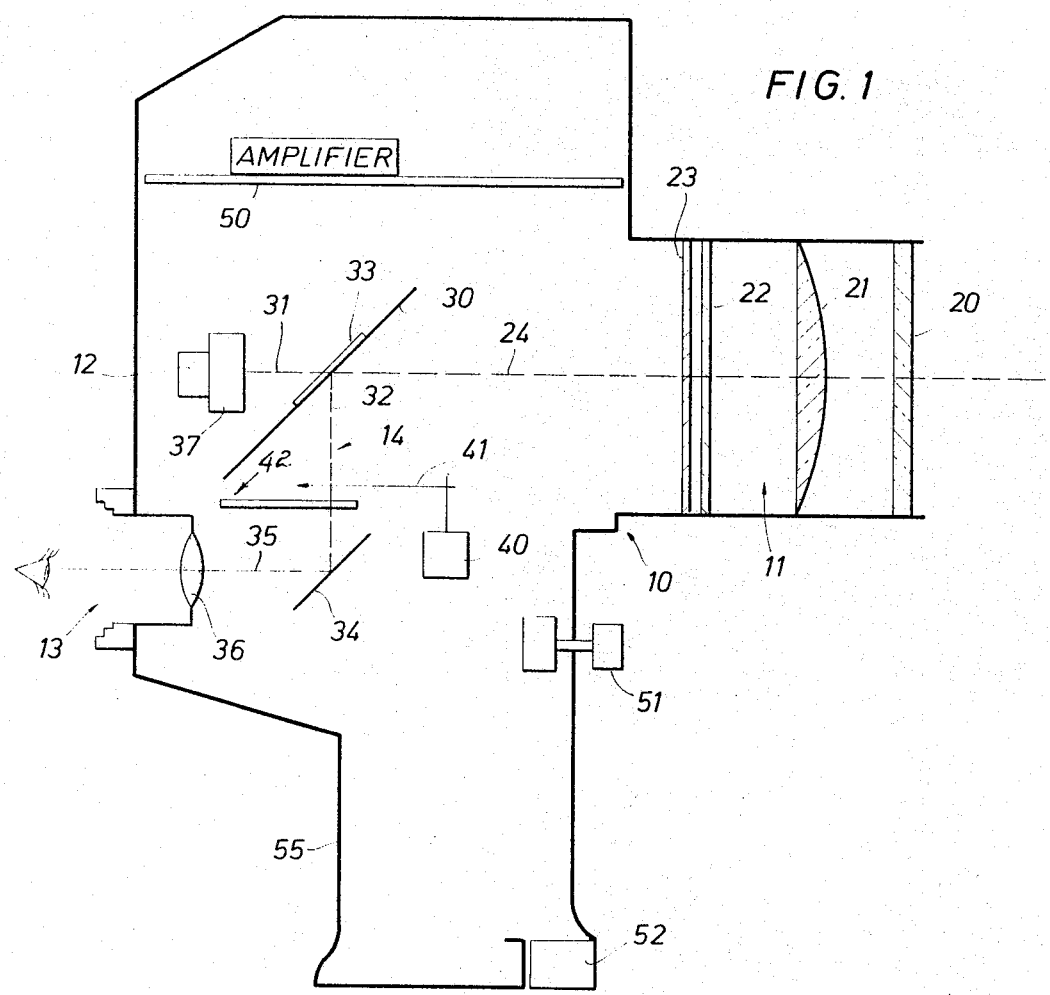
FIG. 1 is an elevation view of an instrument constructed according to this invention.

Referring now to FIG. 1, there is shown a housing 10 having an optical system 11 disposed therein. The optical system focuses light entering the objective lens on the detector 12 whose signal is amplified and displayed on a meter 14. An observer may view both the meter and the object being viewed through a viewing means formed by an eye piece 13. As explained above, the optical system includes means for adjusting the response of the instrument to the light source to a preset meter value. This effects a calibration of the instrument to the same standard each time it is used. The optical system also includes suitable filters for passing the same light spectrum normally viewed by a human observer, while provisions are made for the human observer to view both the response of the instrument on the meter 14 and the smoke plume.

The optical system comprises a variable or rotably mounted filter 20 and a fixedly mounted filter 23 which in combination permit adjustment of the light transmissibility to calibrate or standardize the instrument's response to a fixed or preset meter value prior to each use. The two filters 20 and 23 are polarized filters that vary the light transmitted as the axis of one filter is moved with respect to the axis of the other filter. This can be done by rotating the filter 20 with respect to the fixed filter 23. The optical system also utilizes a lens 21 which focuses the light on the detector 12. In addition, the lens 21 and the size and position of the detector define a very narrow field of view to substantially eliminate the response of the instrument to extraneous sources of light. For example, it has been found that a 1° – 3° field of view provides excellent results when the observer is positioned not over 1,000 feet from the smoke plume. The optical system further includes a neutral density filter 22 which is selected to reduce the light transmitted to the detector a set amount. The combination of filters 20, 22 and 23 reduces the light transmitted to a value so that direct observation of the sun through the filters will not damage the eye of the observer. Light of this value still has sufficient magnitude to actuate the detector.

The light traveling along the axis 24 of the optical system strikes a half mirror 30 positioned so that a portion of the light will travel along the axis 31 and impinge upon the detector 12 while the remaining light will be reflected 90° along the axis 32. The half mirror 30 is also provided with a filter 33 which in combination with the filter 37 mounted on the detector 12 provides a spectral response similar to that viewed by the human eye. The combination of the two filters 33 and 37 should be designed to peak at about 5500 angstroms. Thus the complete optical system 11 limits the quantity of light transmitted and in addition passes the same spectrum that is viewed by the human eye.

The light traveling along the axis 32 passes through the transparent scale 42 of the meter movement described below and strikes a second mirror 34 positioned to reflect the light 90° along the axis 35. A focusing lens 36 is provided on the axis 35 so that an operator may simultaneously view the meter scale and the smoke plume when looking through the eye piece 13.

Figure 2:
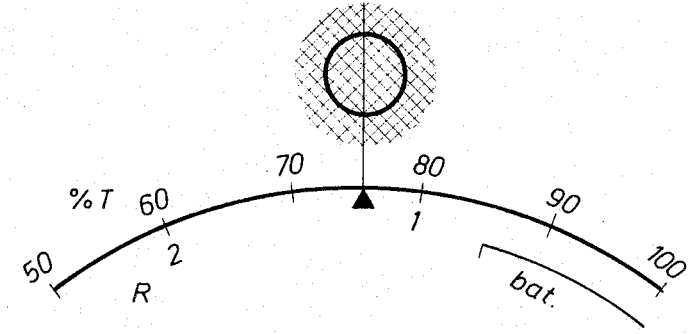
FIG. 2 is a view of the meter scale showing the calibration setpoint and the scale seen by the observer.

The meter provides a visual display and consists of a transparent scale 42, a meter movement 40 and a pointer 41. The meter can be a conventional microampere meter movement in combination with a special scale 42 preferably divided as shown in FIG. 2. More particularly, the full scale response is 50–100 which indicates the percent of light transmitted through the smoke plume where the available light equals 100. The bottom portion of the scale is divided into Ringlemann numbers 2–0 corresponding to 60 to 100% light. The center of the scale there is provided an arrow indicating the preset point used in calibrating the instrument as desscribed below.

Figure 3:
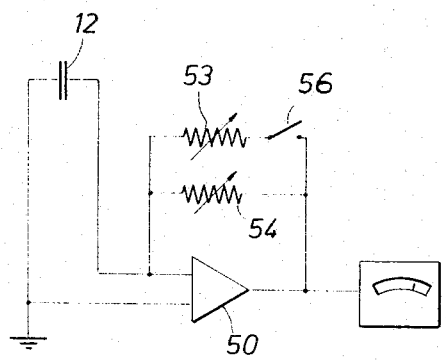
FIG. 3 is a schematic circuit diagram of the instrument.

The signal from the detector 12 is supplied to a simple amplifier 50 whose output is used to drive the meter movement 40. The amplifier may be a conventional operational amplifier having a resistive feedback 54 as shown in FIG. 3. In addition, the amplifier is provided with a second resistance 53 so that its gain may be reduced approximately one half when it is desired to calibrate the instrument. After the instrument is calibrated, the resistance 53 is removed from the amplifier circuit. The switching in and out of the calibrating resistance 53 is done by means of a calibrating switch 56. Similarly, a spring-loaded, push-type switch 51 is used as an on-and-off switch so that the operator may grip the device by means of the handle 55 and depress the switch at the same time.

OPERATION

The device is operated by first installing batteries in the appropriate battery holder and checking their condition by positioning the switch 52 to a battery check position and viewing through the eye piece 13 while pressing the on-off switch 51. The calibrating switch 56 is then switched to a calibrating position and the observer sights the sun or other light source through the eye piece 13 and adjusts the optical system. The instrument is adjusted by moving the variable filter 20 to vary the amount of sunlight transmitted by the optical system and thus vary the output of the detector and amplifier combination. The filter is adjusted until the meter movement assumes a mid-position which standardizes or calibrates the instrument for the available light. This permits the exact calibration or standardization for the conditions existing at the time the observations are made. Thus all operators will obtain the same readings regardless of the existing light and other conditions. After the instrument has been calibrated, the calibrate switch 56 is moved to a read position and the observer sights the instrument on the light source obscured by the smoke plume. The on-off switch can then be pressed and the meter will read directly the percent of light transmitted through the smoke plume as well as the corresponding Ringlemann number. The reading obtained should correspond exactly with the Ringlemann number obtained by a skilled observer sighting the same smoke plume under the same conditions and comparing it with a Ringlemann chart.

From the above description of the operation of the instrument, it is seen that it can readily be calibrated to a preset standard prior to each use. Thus the instrument can be calibrated for the light that exists at the time it is used and does not depend on a precalibration. Further, the calibration is relatively simple since the adjustable or variable filter combination 20 and 23 is adjusted and no adjustments are made to the electronic portion of the instrument. The electronic portion of the instrument can thus be built and calibrated precisely at the time the instrument is manufactured and need not be changed by operating personnel. Further since the instrument relies on an optical system through which the observer can view both the light source, normally the sun, and the smoke plume, a relatively unskilled operator can adjust the instrument and obtain data which will agree exactly with the data obtained by a skilled operator. The calibrating of the instrument on the available light through a midscale meter reading is simpler than trying to calibrate the instrument to a full scale or 100% light transmissibility reading.

We claim as our invention:

1. A hand held opacity for measuring the light transmitted through a stack plume, said meter comprising:
   a housing having grip means disposed to permit an observer to simultaneously hold and operate said opacity meter;
   a lens system mounted in the housing to form a light transmission path having a first axis and disposed to limit the field of view of said opacity meter to less than 3°;
   a fixed filter means mounted in the housing and disposed in the light transmission path on said first axis, said fixed filter being disposed to produce a spectrum of light that approximates that observed by the human eye;
   a variable filter means mounted in the housing and disposed in the light transmission path on said first axis, said variable filter being manually adjustable to adjust the quantity of light transmitted along said transmission path to a predetermined value;
   a light sensitive detector mounted in the housing and disposed in the light transmission path on said first axis, said detector being sized and positioned in said light transmission path to supply an output signal proportional to the light transmitted through the plume;
   meter means coupled to said detector for displaying the magnitude of the detected signal; and
   optical means mounted in the housing and disposed to permit an observer to simultaneously observe along a second axis parallel to said first axis and spaced therefrom said meter means and the stack plume through said lens system.

2. The opacity meter of claim 1 wherein said detector is coupled to said meter through an amplifier.

3. The opacity meter of claim 1 wherein said optical means includes a half mirror disposed in the transmission path between said lens and said detector to direct a portion of the transmitted light on said optical means.

4. The opacity meter of claim 3 and in addition calibration means including means for setting said amplifier means at a reduced gain whereby said adjustable filter may be adjusted to provide a predetermined meter reading.

5. The opacity meter of claim 4 wherein said preset meter reading is approximately half scale.

6. The opacity meter of claim 1 wherein said variable filter comprises a first and second polarizing filter, said first filter being fixedly mounted and said second filter being movably mounted so that the alignment of the axes of said first and second filters may be varied.

* * * * *